United States Patent
Fredrickson

(10) Patent No.: US 11,643,999 B2
(45) Date of Patent: May 9, 2023

(54) FUEL RAIL AND ASSEMBLY

(71) Applicant: Arctic Cat Inc., Thief River Falls, MN (US)

(72) Inventor: Ken Ray Fredrickson, Thief River Falls, MN (US)

(73) Assignee: ARCTIC CAT INC., Thief River Falls, MN (US)

( * ) Notice: Subject to any disclaimer, the term of this patent is extended or adjusted under 35 U.S.C. 154(b) by 34 days.

(21) Appl. No.: 17/089,033

(22) Filed: Nov. 4, 2020

(65) Prior Publication Data

US 2021/0148318 A1    May 20, 2021

Related U.S. Application Data

(60) Provisional application No. 62/937,078, filed on Nov. 18, 2019.

(51) Int. Cl.
| | |
|---|---|
| *F02M 55/02* | (2006.01) |
| *F02M 55/04* | (2006.01) |
| *F02B 75/02* | (2006.01) |
| *F02M 35/10* | (2006.01) |
| *F02F 7/00* | (2006.01) |
| *F02B 75/18* | (2006.01) |
| *B62M 27/02* | (2006.01) |

(52) U.S. Cl.
CPC .......... *F02M 55/025* (2013.01); *B62M 27/02* (2013.01); *F02B 75/02* (2013.01); *F02B 75/18* (2013.01); *F02F 7/0002* (2013.01); *F02M 35/10222* (2013.01); *F02M 55/04* (2013.01); *B62M 2027/027* (2013.01); *B62M 2027/028* (2013.01); *F02B 2075/025* (2013.01); *F02B 2075/1808* (2013.01); *F02M 2200/857* (2013.01); *F02M 2200/9007* (2013.01); *F02M 2200/9015* (2013.01)

(58) Field of Classification Search
CPC ..... F02M 55/025; F02M 55/04; B62M 27/02; F02B 75/02
See application file for complete search history.

(56) References Cited

U.S. PATENT DOCUMENTS

| | | |
|---|---|---|
| 5,762,040 A | 6/1998 | Taipale et al. |
| 5,791,304 A | 8/1998 | Taipale |
| 5,845,621 A * | 12/1998 | Robinson ............. F02M 69/465 |
| | | 123/456 |
| 7,410,022 B1 | 8/2008 | Berg et al. |
| (Continued) | | |

OTHER PUBLICATIONS

Monobloc Engine, Wikipedia, https://en.wikipedia.org/w/index.php?title=Monobloc_engine&oldid=918641966, Sep. 29, 2019 (Year: 2019).*

(Continued)

*Primary Examiner* — Kevin A Lathers
(74) *Attorney, Agent, or Firm* — Billion & Armitage

(57) ABSTRACT

In some embodiments, a fuel rail for a two-stroke internal combustion engine includes a fuel rail body, a fuel inlet component integrated within the fuel rail body as a one-piece component and in fluidic contact with a fuel line, one or more fuel exit ports in fluidic contact with a cylinder of a combustion engine, and one or more fasteners adapted to secure the fuel rail body to a cylinder wall of the cylinder of the combustion engine.

22 Claims, 11 Drawing Sheets

(56) References Cited

U.S. PATENT DOCUMENTS 9,458,808 B1    10/2016   Torgerud
2008/0202472 A1*   8/2008   Whatley .............. F02M 69/465
                                                                                       123/468

OTHER PUBLICATIONS

"Mercury Outboard Fuel Rails Schematic | Performance Marine", 2019https://mercuryperformance.com/parts/category/outboard/2-stroke-dfi-optimax/225-dfi-3-0 . . . , 1-11.
"Polaris OEM Snowmobile Parts", 2019https://snowmobiles.polaris.com/en-us/parts/, 1-3.
"Quicksilver 858222A3 Mercury Fuel Rail 2.5L Starboard", 2019http://lotastock.com/quicksilver-858222a-3-mercury-fuel-rail-25l-starboard-ls2353, 1-3.

* cited by examiner

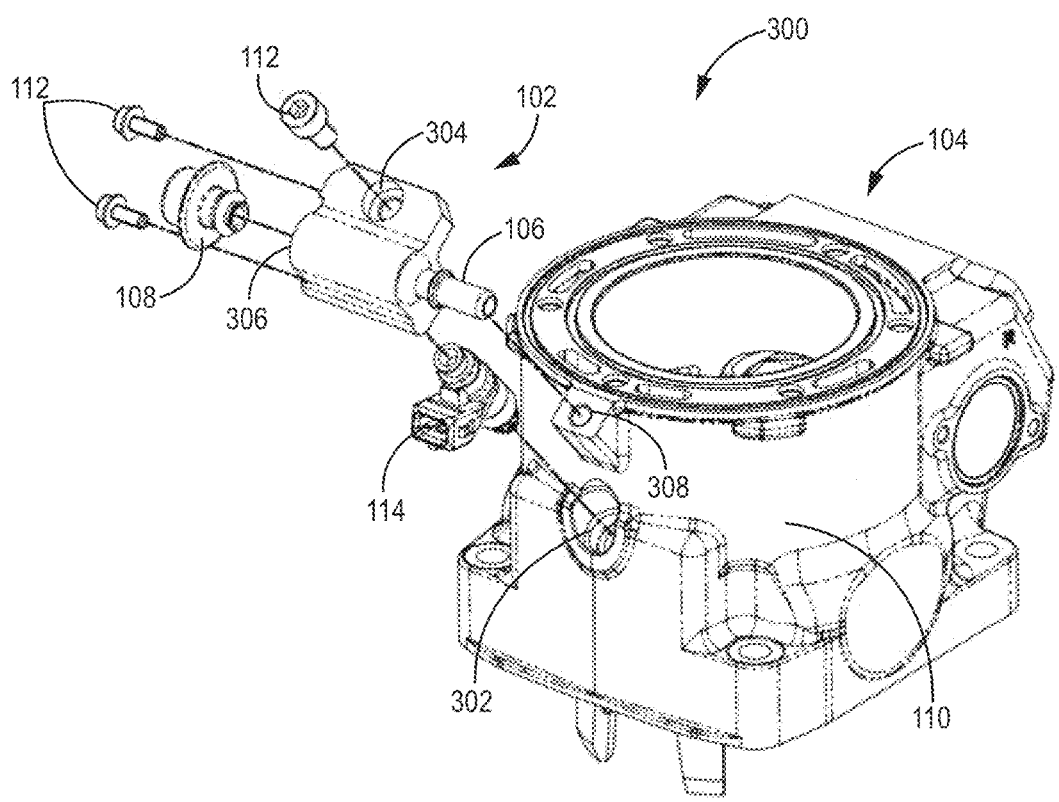
FIG. 3
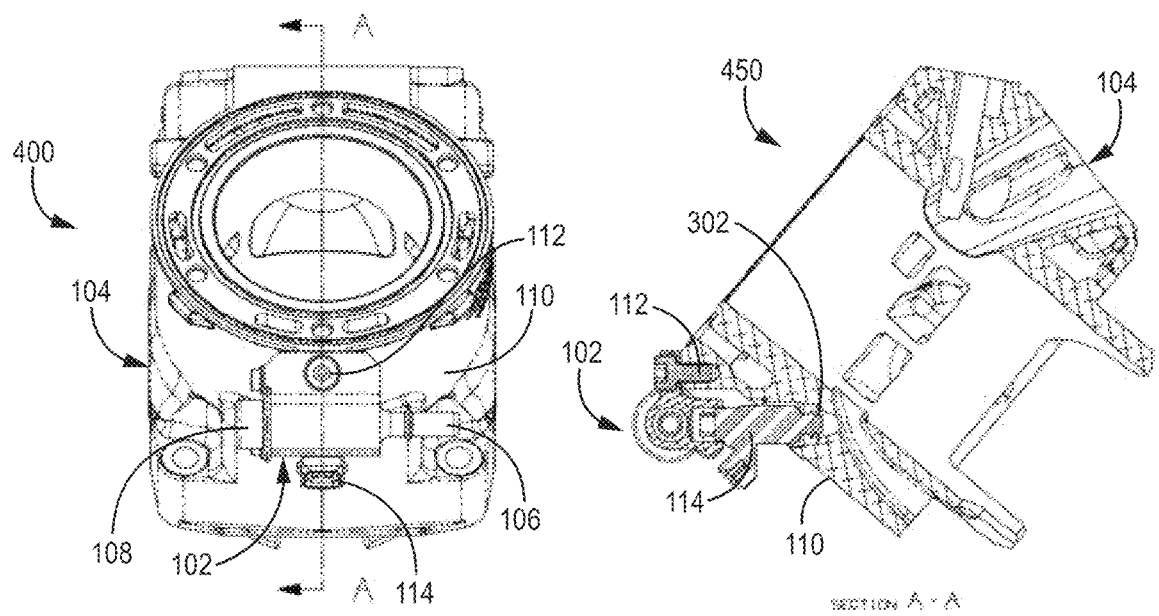
FIG. 4A  FIG. 4B

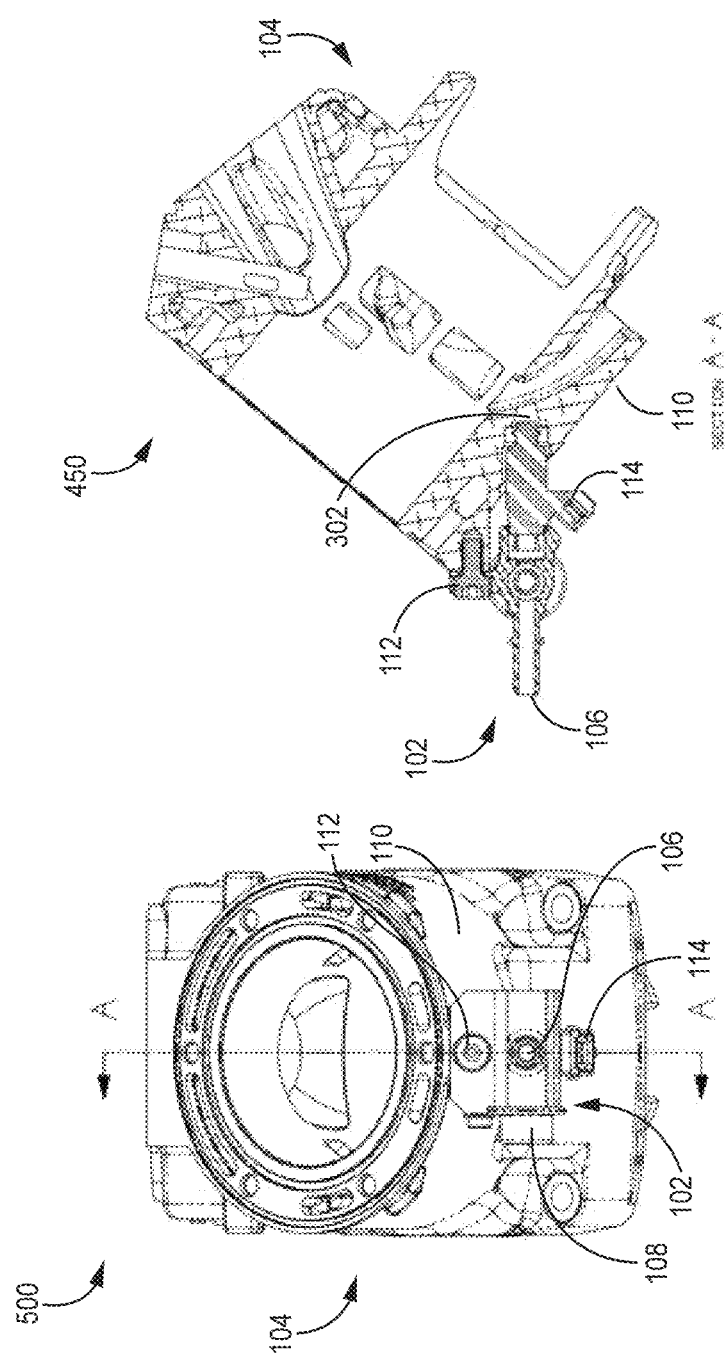

FUEL RAIL AND ASSEMBLY

BACKGROUND

Fuel rails make up or are part of a fuel delivery system for an internal combustion engine, including fuel injection systems. Fuel rails distribute fuel to one or more fuel injectors for introduction of fuel to one or more cylinders. Fuel rails are utilized in many types of vehicles including automobiles. For alternative applications (e.g. utility vehicles, marine vehicles, motorcycles, snowmobiles), automotive fuel rails are often utilized out of convenience. These rails are typically cast or molded and incur high tooling and production costs. Additionally, such fuel rail components are typically not optimized for the performance, space needs, and cost constraints of alternative applications, such as in two-stroke engines.

SUMMARY

In some embodiments, a fuel rail for a two-stroke internal combustion engine includes a fuel rail body, a fuel inlet component integrated within the fuel rail body as a one-piece component and in fluidic contact with a fuel line, one or more fuel exit ports in fluidic contact with a cylinder of a combustion engine, and one or more fasteners adapted to secure the fuel rail body to a cylinder wall of the cylinder of the combustion engine.

Embodiments further include a fuel rail assembly for a two-stroke internal combustion engine, including a fuel rail body that includes at least one damper opening, a fuel inlet component integrated within the fuel rail body as a one-piece component and in fluidic contact with a fuel line, one or more dampers positioned in contact with the at least one damper opening, one or more fuel exit ports, one or more fuel injectors in fluidic contact with the one or more fuel exit ports and at least one cylinder of a combustion engine, and one or more fasteners, adapted to secure the fuel rail body to a cylinder wall of the cylinder of the combustion engine.

Embodiments include a two-stroke internal combustion engine including one or more cylinders and crankcase for housing a combustion process of an internal combustion engine, a fuel rail assembly that includes a fuel rail body including at least one damper opening, a fuel inlet component, integrated within the fuel rail body as a one-piece component and in fluidic contact with a fuel line, one or more dampers positioned in contact with the at least one damper opening, one or more fuel exit ports, one or more fuel injectors, in fluidic contact with the one or more fuel exit ports and at least one cylinder of the combustion engine, one or more fasteners adapted to secure the fuel rail body to a cylinder wall of the cylinder of the combustion engine, an ignition system for igniting fuel within the one or more cylinders and crankcase, an air intake system positioned at least partially in one or more of the crankcase and one or more cylinders for providing air to the crankcase and the cylinders, and an exhaust system for ejecting gases from the one or more cylinders and crankcase.

Additionally, embodiments include a snowmobile, including an engine mounted on a chassis, the engine including a fuel rail assembly that includes a fuel rail body including at least one damper opening a fuel inlet component integrated within the fuel rail body as a one-piece component and in fluidic contact with a fuel line, one or more dampers positioned in contact with the at least one damper opening, one or more fuel exit ports, one or more fuel injectors in fluidic contact with the one or more fuel exit ports and at least one cylinder of the combustion engine, one or more fasteners adapted to secure the fuel rail body to a cylinder wall of the cylinder of the combustion engine, handlebars and one or more skis in contact with the chassis, a drive track in contact with the chassis, and a drive train operatively interconnecting the engine with the drive track for delivering propulsive power to the drive track.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 3 illustrates an exploded view 300 of a cylinder with fuel rail, according to some embodiments of this disclosure.

FIGS. 4A-B illustrate a perspective view 400 (FIG. 4A) and a cross-sectional view 450 along line A-A (FIG. 4B) of a cylinder with fuel rail, according to some embodiments of this disclosure.

FIGS. 5A-B illustrate a perspective view 500 (FIG. 5A) and a cross-sectional view 550 along line A-A (FIG. 5B) of a cylinder with fuel rail in which the fuel inlet is perpendicular to the length of the fuel rail body, according to some embodiments of this disclosure.

DETAILED DESCRIPTION

Embodiments of the present disclosure describe fuel rails, fuel rail assemblies such as fuel injection systems, engines with fuel rails, and vehicles utilizing fuel rails for two-stroke crankcase scavenged internal combustion engines (e.g. utility vehicles, marine vehicles, motorcycles, snowmobiles). Fuel rails are often utilized for fuel pressure normalization and distribution to a fuel injection system in an internal combustion engine. The fuel rail receives fuel from a fuel inlet connected to a fuel line or hose that further connects to one or more fuel reservoirs or tanks. One or more pumps are typically utilized to transfer fuel from the one or more reservoirs to the fuel rail. The pumping of the fuel often causes pulsing or oscillation in the fuel and one or more dampers are positioned in a fuel rail to absorb or normalize the pressure and pulsations. Optionally, one or more external dampers may be utilized outside the fuel rail assembly, such as in the fuel line. The fuel damper may utilize some combination of springs, diaphragms or other components to absorb pulses, for example. The fuel then exits the fuel rail into one or more fuel injectors, which then deliver fuel into one or more cylinders within the engine.

The fuel rails described herein replace components traditionally cast, molded or assembled in multiple parts and may now be integrated into one-piece construction and optimized for lower-cost construction, increased performance, and efficiencies in assembly and space utilization within a vehicle. For example, portions of or complete fuel rail bodies can be extruded as one-piece construction. The fuel inlet component can be formed as a part of the one-piece construction and in some embodiments, the number and position of dampers can be optimized across a plurality of factors.

Figure 1A:
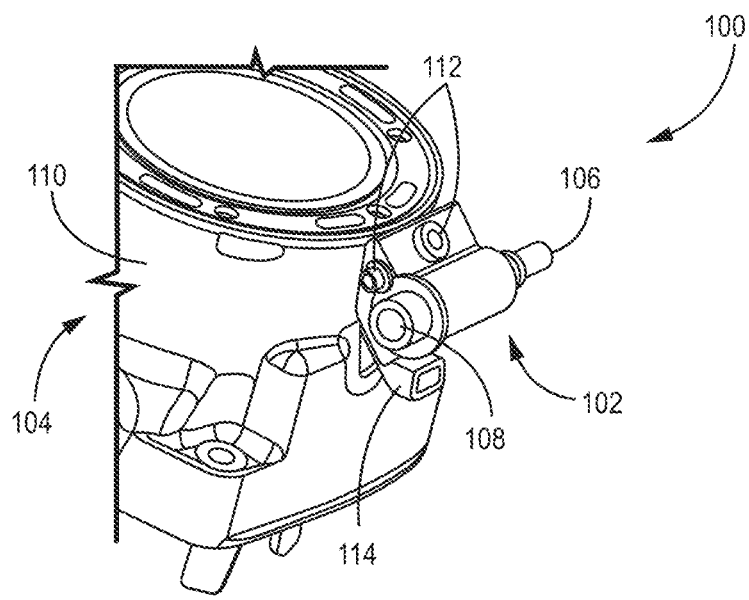
FIGS. 1A-B illustrate perspective view 100, 150 of a cylinder with fuel rail, according to some embodiments of this disclosure.
Figure 1B:
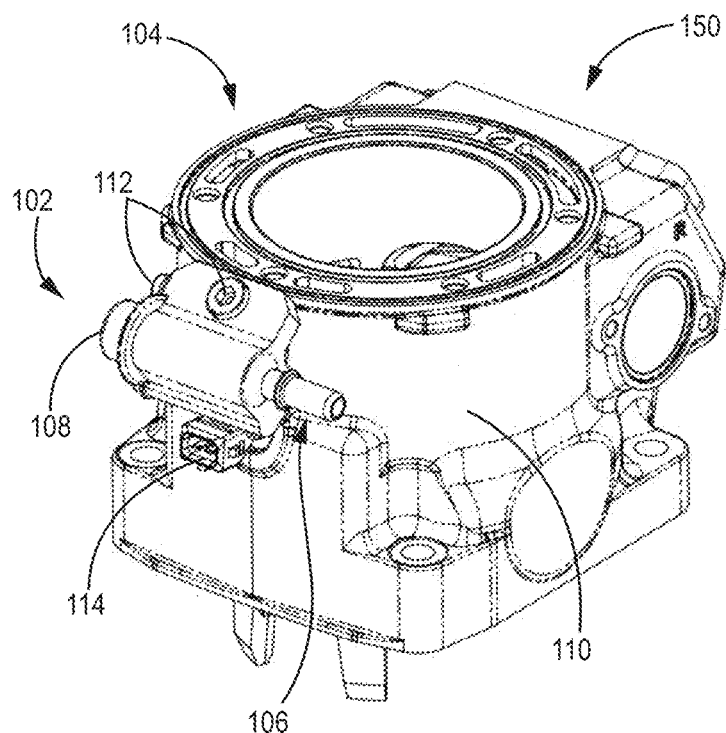

FIGS. 1A-B illustrate perspective view 100, 150 of a cylinder 104 with fuel rail 102, according to some embodiments of this disclosure. A fuel rail 102 is in contact with a cylinder wall 110 of a cylinder 104 as part of a two-stroke internal combustion engine. The fuel rail 102 includes a damper 108 and the rail 102 is further in contact with at least a portion of fuel injector 114. One or more fasteners 112 secure the fuel rail 102 components to each other or to the cylinder wall 110. A fuel inlet 106 may be integrated with the body of the fuel rail 102.

The fuel rail 102 and fuel inlet 106 may be formed and machined as a single part. Forming may include extrusion, but may also include casting, forging or molding. Such one-piece manufacture reduces tooling and parts costs and also reduces the chance of fuel leakage between the fuel rail 102 and fuel inlet 106. The fuel rail 102 may be extruded and then subsequently machined. The fuel rail 102 may be manufactured of one or more of carbon steel, aluminum alloys, aluminum, steel, magnesium, plastic, ceramic, or a composite material (e.g., formed from an epoxy resin and fibers such as carbon fiber, Kevlar, etc.), and titanium alloys. Once the fuel rail 102 body is formed, one or more features may be machined. The one or more features may include fastener holes and recesses, fuel inlet 106 and exit ports, fuel injection recesses or holes, etc. Machining may include one or more of laser, plasma, flame and saw cutting, metal machining, computer numeric control (CNC) machining, chiseling, and bending, for example. Bending is done by hammering (manual or powered) or via press brakes and similar tools. Assembling (joining of the pieces) is done by welding, binding with adhesives, riveting, threaded fasteners, or additional bending in the form of a crimped seam. After forming, the fuel rail 102 can be hardened or hardening coats applied, for example.

The fuel rail 102 can be mounted directly to a cylinder 104, such as by securing to a cylinder wall 110 via one or more fasteners 112. In an alternative embodiment, fuel rail 102 can be mounted and secured to one or more cylinder heads or a combination of cylinder heads. In a mono-block constructed engine, the fuel rail 102 can be mounted to a single head that includes a plurality of cylinders in contact with the head. Fasteners 112 can also be utilized to secured fuel rail 102 components and can include screws, bolts, rivets, etc. One or more injectors 114 may be positioned between the fuel rail 102 and the cylinder 104. One end of the injector 114 may be positioned in the cylinder wall 110 and the other end in contact with one or more fuel exit ports (not shown) in the fuel rail 102. The fuel rail 102 may also house one or more fuel dampers 108. The fuel damper 108 may be positioned in a variety of placements, based on the design of the fuel rail 102. The fuel damper 108 can be located parallel, perpendicular or any angle in between in relation to the cylinder 104 or fuel inlet 106. In FIGS. 1A-B, the fuel damper 108 is positioned in-line with fuel inlet 106. The fuel damper 108 can be mounted with an o-ring and fastener, snap ring, pressed into the housing, adhered, or threaded in, for example. In an alternative embodiment, the fuel rail 102 includes no dampers 108 and one or more optional dampers 108 may be located outside the fuel rail 102 assembly, such as in a fuel line.

Figure 2:
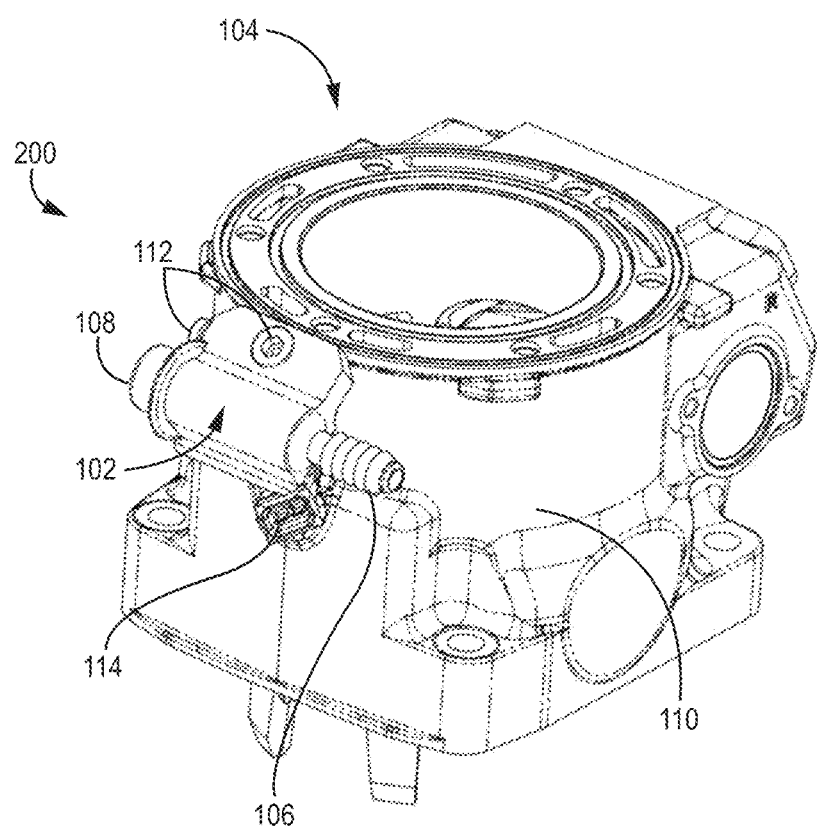
FIG. 2 illustrates a perspective view 200 of a cylinder with fuel rail in which the fuel inlet is a barbed component, according to some embodiments of this disclosure.

The fuel inlet 106 connects or is integrated with a fuel line or hose (not shown), such as with a fuel inlet connection component. The fuel inlet 106 can be a male or female fitting component, include a quick coupling attachment for the fuel line, or be adapted to allow a hose and clamp, for example. In one embodiment (see view 200 of FIG. 2), the fuel inlet 106 can include a barbed component for securing and adhering a fuel line or hose. The fuel inlet 106 is shown in an in-line position with the fuel rail 102 body, but can also be positioned perpendicular to the fuel rail 102 body (see FIGS. 5A-B, for example) or in any angle in between parallel and perpendicular. In one embodiment, one or more fuel inlets 106 can be positioned in a perpendicular position to the length of the fuel rail 102 body and cylinder wall 110 and allow for two dampers 108 to be positioned at distal ends of the fuel rail 102 and in-line with the fuel rail 102 body.

Referring to FIG. 3, an exploded view 300 of a cylinder 104 with fuel rail 102 is shown, according to some embodiments of this disclosure. The fuel injector recess 302 allows for the fuel injector 302 to contact the cylinder wall 110 and deliver fuel to the cylinder 104. The fuel injector recess 302 can be a hole or channel and can optionally structurally secure and support the position of the fuel injector 114. Opposite the fuel injector recess 302, the fuel injector 114 contacts the fuel rail 102 via fuel exit ports (not shown). Fastener recess 304 allow for fasteners 112 to secure fuel rail 102 components internally and also to the cylinder wall 110. On the cylinder wall 110, fastener openings 308 or additional recesses are positioned to receive the fasteners 112. A damper opening 306 in the fuel rail 102 receives damper 108.

Referring to FIGS. 4A-B, a perspective view 400 (FIG. 4A) and a cross-sectional view 450 along line A-A (FIG. 4B) of a cylinder 104 with fuel rail 102 are shown, according to some embodiments of this disclosure. View 450 shows the fuel injector 114 in fuel injector recess 302 and its fluidic connection to the interior of the cylinder 104 for delivery of fuel. FIGS. 5A-B show a perspective view 500 (FIG. 5A) and a cross-sectional view 550 along line A-A (FIG. 5B) of a cylinder 104 with fuel rail 102 in which the fuel inlet 106 is perpendicular to the length of the fuel rail 102 body and perpendicular to the cylinder wall 110, according to an embodiment.

Figure 6:
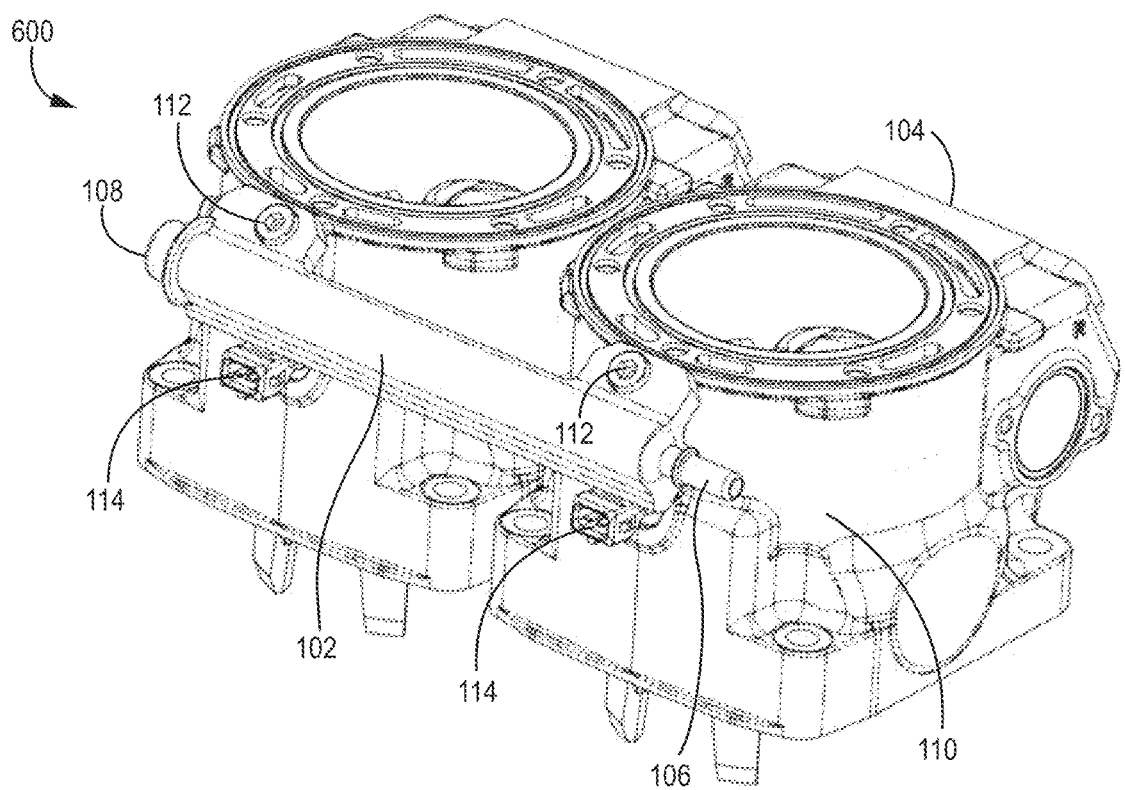
FIG. 6 illustrates a perspective view 600 of cylinders with twin fuel rail, according to some embodiments of this disclosure.

Referring to FIG. 6, a perspective view 600 of cylinders 104 with twin fuel rail 102 is shown, according to some embodiments of this disclosure. Twin fuel rail 102 refers to single fuel rail 102 spanning across two cylinders 104 or a mono-block including more than one cylinder 104, for example. Fuel rail 102 can be a twin rail or assembly and span across and in contact with two cylinders 104. The rail 102 can optionally expand to three or more cylinders 104, for example. In this embodiment, the twin fuel rail 102 includes a single fuel damper 108 and the damper 108 and fuel inlet 106 are in-line with the fuel rail 102 body. In other embodiments, the one or more dampers 108 can be in-line or in a perpendicular position, or at an angle in between. Similarly, the fuel inlet 106 can be in-line or in a perpendicular position, or at an angle in between.

Figure 7:
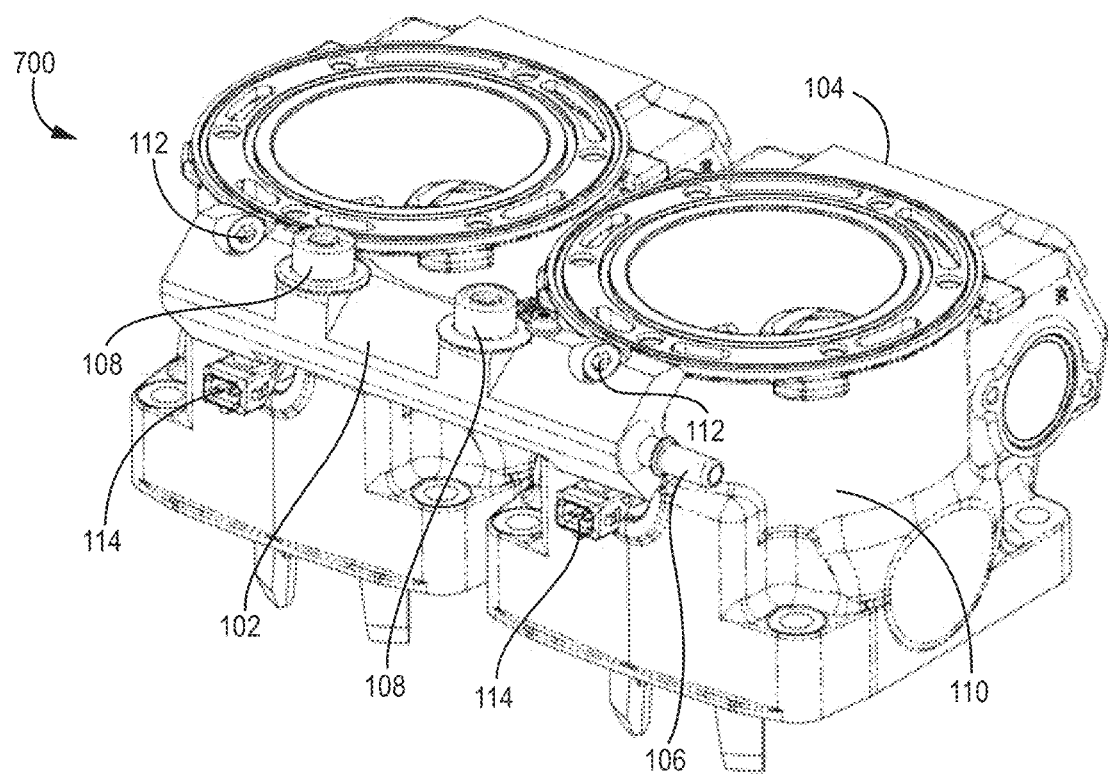
FIG. 7 illustrates a perspective view 700 of cylinders with twin fuel rail including a plurality of dampers, according to some embodiments of this disclosure.
Figure 8:
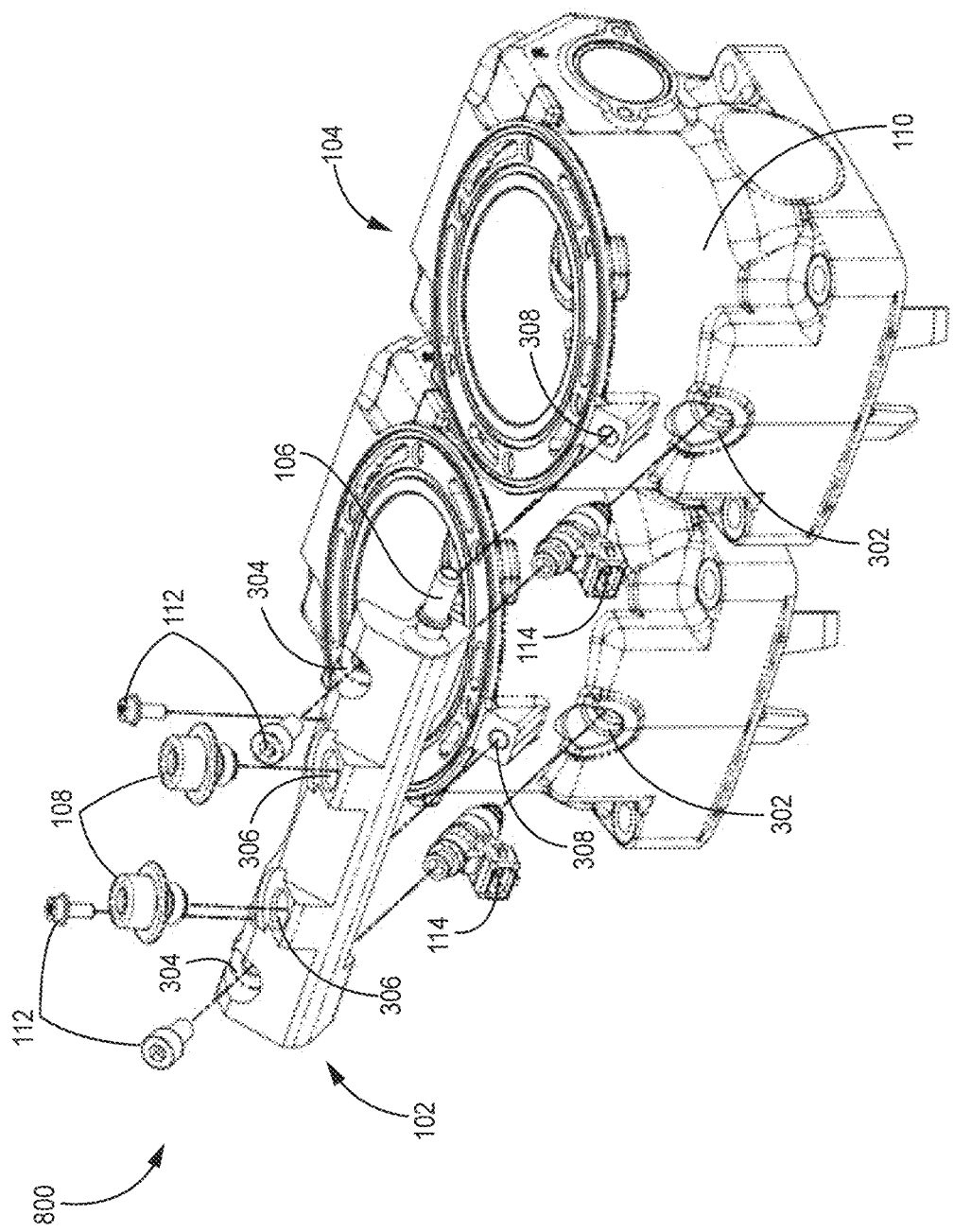
FIG. 8 illustrates an exploded view 800 of cylinders with twin fuel rail including a plurality of dampers, according to some embodiments of this disclosure.
Figures 9A, 9B:
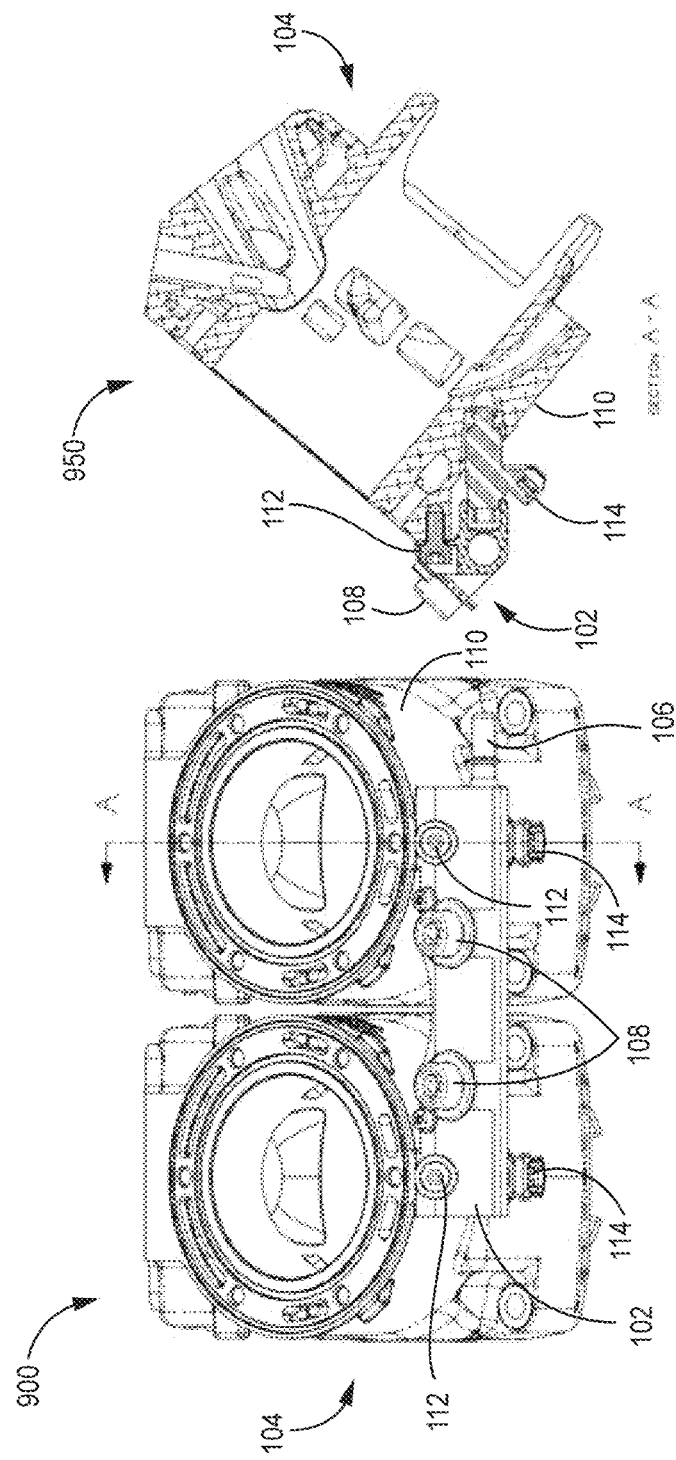
FIGS. 9A-B illustrate a perspective view 900 (FIG. 9A) and a cross-sectional view 950 along line A-A (FIG. 9B) of cylinders with a twin fuel rail, according to some embodiments of this disclosure.

Referring to FIG. 7, a perspective view 700 of cylinders 104 with twin fuel rail 102 including a plurality of dampers 108 is shown, according to some embodiments of this disclosure. The fuel rail 102 in contact with a plurality of cylinders 104 includes a plurality of dampers 108. In this example, the dampers 108 are positioned perpendicular to the fuel rail 102 body and to the cylinder wall 110. Each cylinder 104 includes a corresponding fuel injector 114. View 800 of FIG. 8 illustrates an exploded view of the above embodiment. FIGS. 9A-B illustrate a perspective view 900 (FIG. 9A) and a cross-sectional view 950 along line A-A (FIG. 9B) of the above embodiment, in which a plurality of dampers 108 are utilized with a twin fuel rail 102 assembly.

Figure 10A:
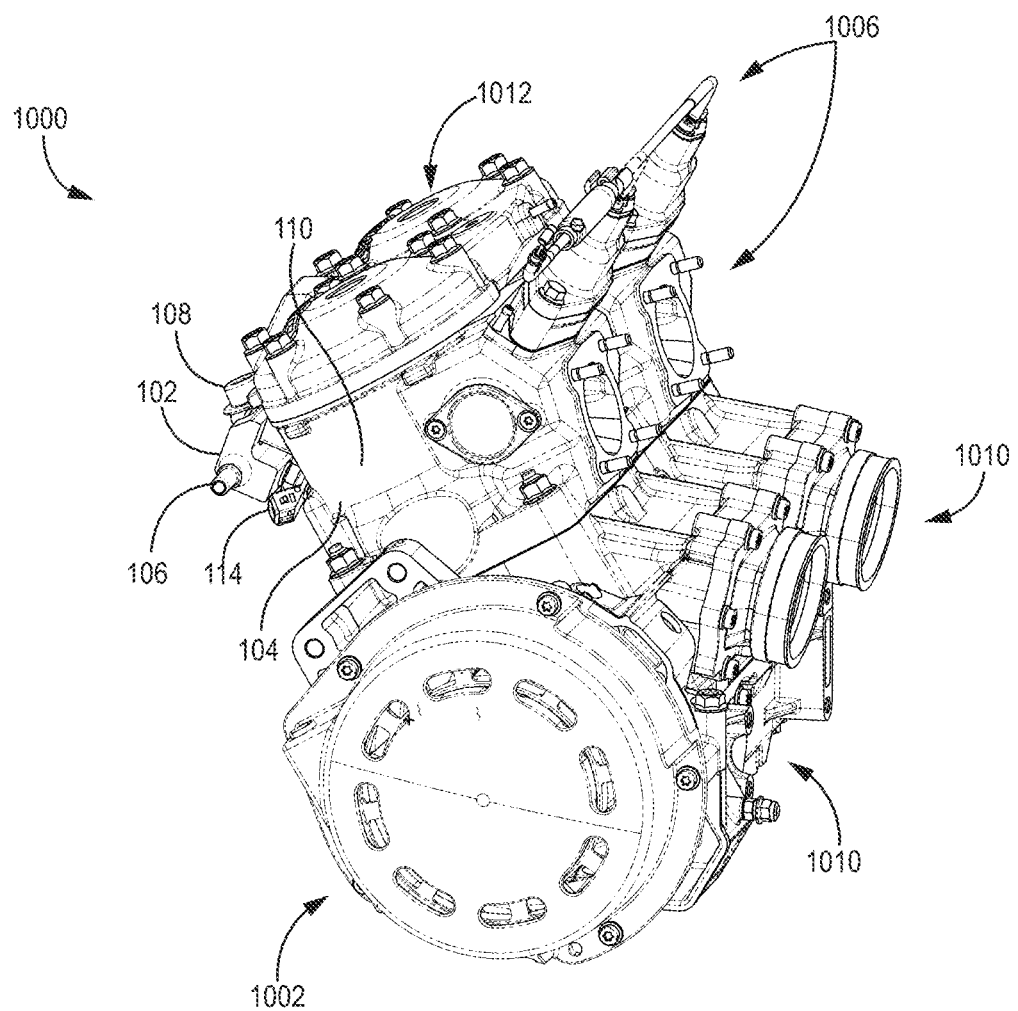
FIGS. 10A-B illustrate perspective views 1000, 1050 of a two-stroke engine with fuel rail, according to some embodiments of this disclosure.
Figure 10B:
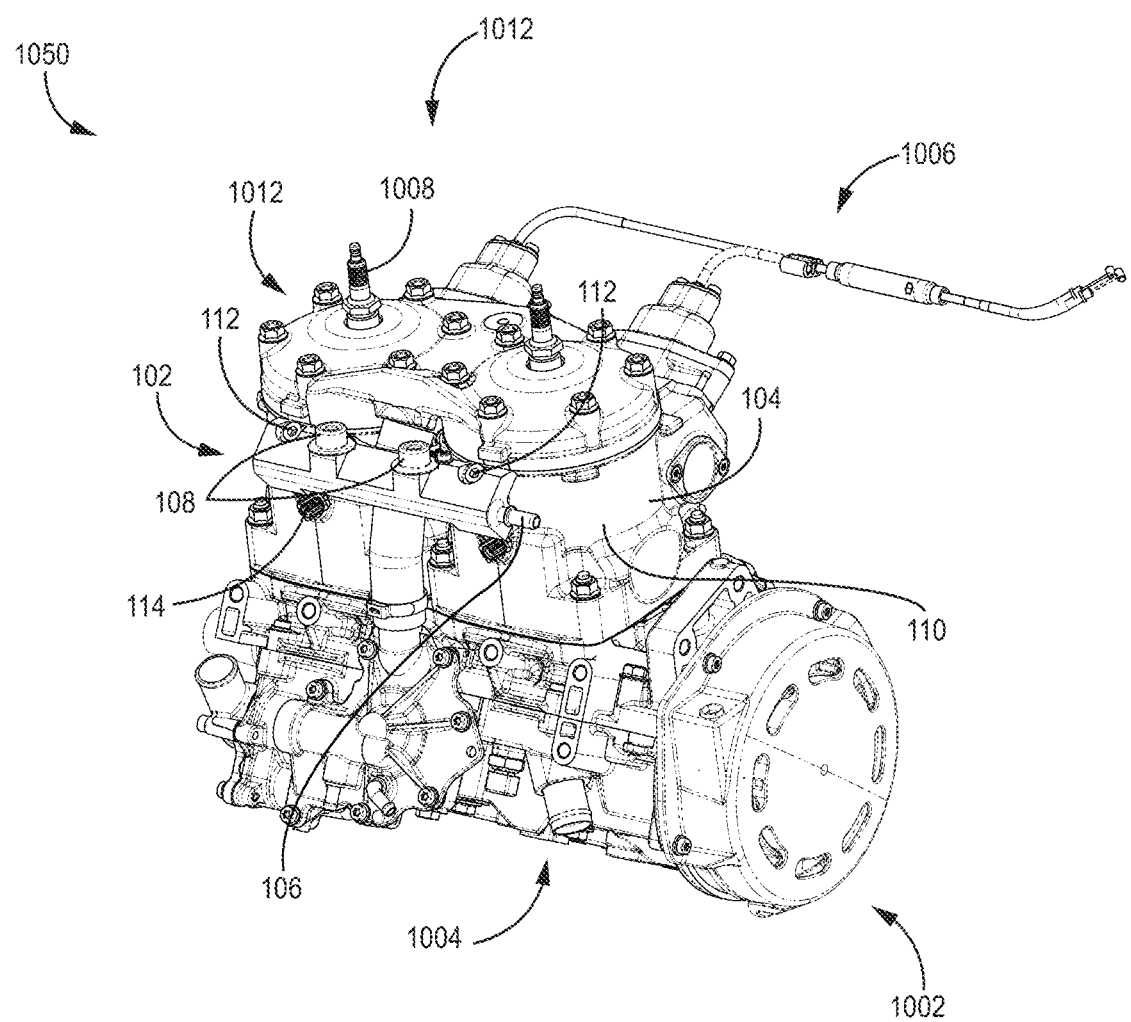

Referring to FIGS. 10A-B, perspective views 1000, 1050 of a two-stroke engine with fuel rail 102 are shown, according to some embodiments of this disclosure. A twin fuel rail 102 is shown in contact with two cylinders 104 in an engine 1002, such as a two-stroke crankcase scavenged internal combustion engine. The cylinders 104 can be in contact with cylinder heads 1012 and include an ignition system 1008. An air intake system 1010 feeds air to the crankcase 1004. The air intake system 1010 can be positioned at least partially in one or more of the crankcase 1004 and/or one or more cylinders 104, or any combination thereof. An exhaust system 1006, including exhaust valves and ports to control and funnel air and exhaust gases out of the cylinders 104.

Figure 11:
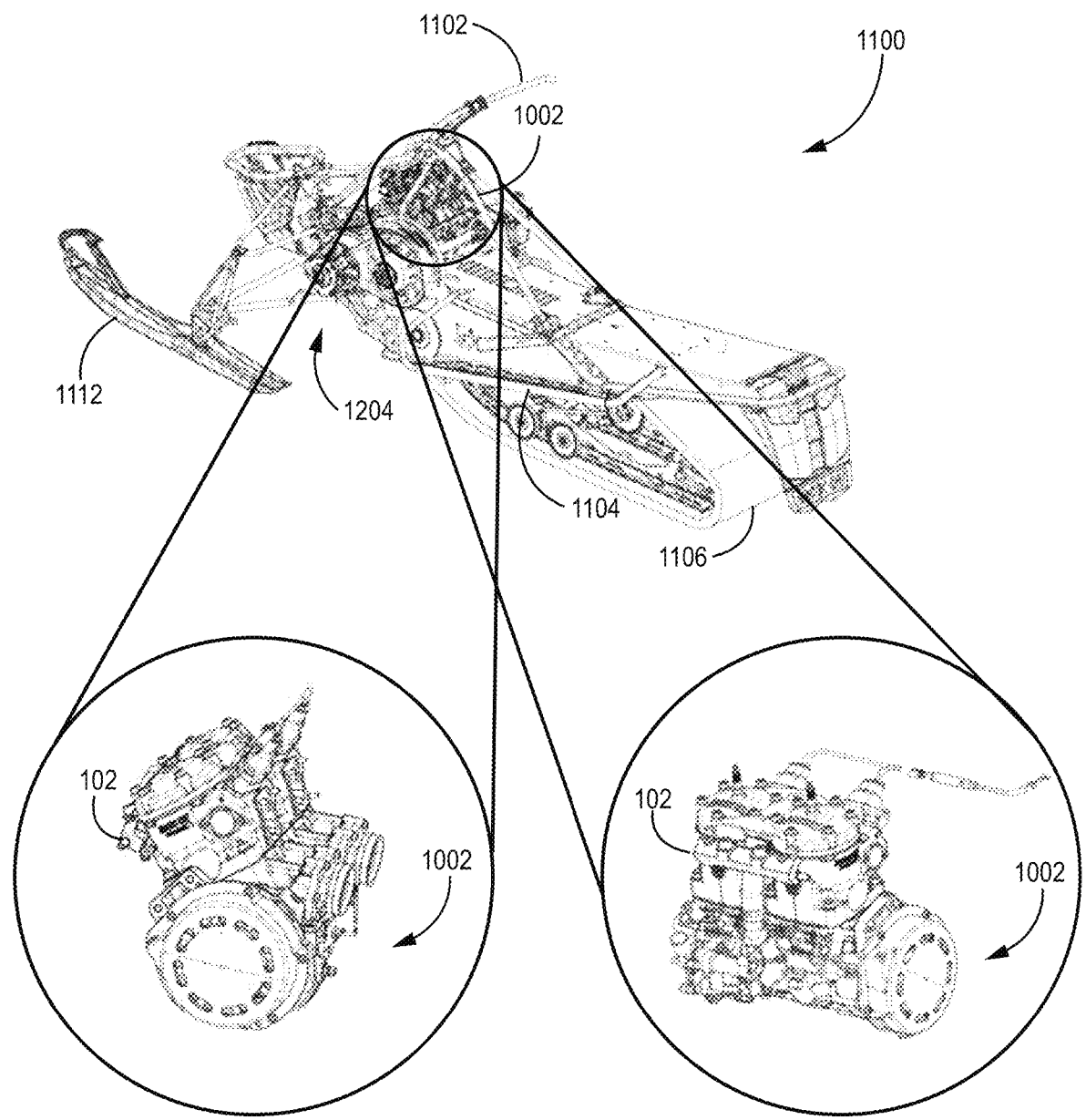
FIG. 11 illustrates a perspective view 1100 of a snowmobile without shroud or seat and includes expanded views of an engine with fuel rail, according to some embodiments of this disclosure.

Referring to FIG. 11 a perspective view 1100 of a snowmobile without shroud or seat and includes expanded views of an engine 1002 with fuel rail 102, according to some embodiments of this disclosure. A chassis 1104 or frame supports an engine 1002, drive or power train 1204, a drive track 1106, handlebars 1102 and skis 1112. A shroud or fairing (not shown) in contact with the chassis 1104 covers and protects various components of the vehicle. A seat (not shown) is positioned rearward of the handlebars 1102. With the shroud and seat removed, the engine 1002 is shown in contact with a drive train 1204. The drive train 1204 includes a continuously variable transmission (CVT), for transferring power from the engine 1002 to the drive track 1106.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A fuel rail for a two-stroke internal combustion engine, comprising:
   a fuel rail body;
   a fuel inlet component, integrated within the fuel rail body as a one-piece component and in fluidic contact with a fuel line;
   one or more fuel exit ports, in fluidic contact with a cylinder of a combustion engine; and
   a fastener configured to secure the fuel rail body to a cylinder wall of the combustion engine, wherein the fastener contacts the cylinder wall.

2. The fuel rail of claim 1, wherein the fuel rail is manufactured of one or more of carbon steel, aluminum alloys, aluminum, steel, magnesium, plastic, ceramic, composite material, and titanium alloys.

3. The fuel rail of claim 1, further comprising at least one damper opening in the fuel rail body, and one or more dampers positioned in contact with the at least one damper opening.

4. The fuel rail of claim 3, wherein the one or more dampers comprises a single damper positioned at a distal end and in-line with the fuel rail body.

5. The fuel rail of claim 3, wherein the one or more dampers are positioned perpendicular to the length of the fuel rail body.

6. The fuel rail of claim 1, further comprising one or more fuel injectors in fluidic contact with the one or more exit ports.

7. The fuel rail of claim 1, wherein the fuel inlet port includes a fuel line connection component.

8. The fuel rail of claim 1, wherein the fastener is received within the cylinder wall.

9. The fuel rail of claim 1, wherein the fastener is in contact with the fuel rail body and the cylinder wall.

10. The fuel rail of claim 1, wherein the cylinder wall includes a fastener recess configured to receive the fastener.

11. The fuel rail of claim 10, wherein the fastener recess is threaded.

12. The fuel rail of claim 1, wherein the fuel inlet is positioned at a distal end and in-line with the fuel rail body.

13. The fuel rail of claim 1, wherein the fuel inlet is positioned perpendicular to the length of the fuel rail body.

14. A fuel rail assembly for a two-stroke internal combustion engine, comprising:
a fuel rail body, including at least one damper opening;
a fuel inlet component, integrated within the fuel rail body as a one-piece component and in fluidic contact with a fuel line;
one or more dampers, positioned in contact with the at least one damper opening;
one or more fuel exit ports;
one or more fuel injectors, in fluidic contact with the one or more fuel exit ports and at least one cylinder of a combustion engine; and
one or more fasteners, adapted to secure the fuel rail body to a cylinder wall of the cylinder of the combustion engine,
wherein the fuel rail body contacts the cylinder wall.

15. The fuel rail assembly of claim 14, wherein the fuel rail body contacts two cylinder walls of an engine.

16. The fuel rail assembly of claim 15, wherein the fuel rail includes a single fuel damper.

17. A two-stroke internal combustion engine, comprising:
one or more cylinders and crankcase, for housing a combustion process of an internal combustion engine;
a fuel rail assembly, including:
a fuel rail body, including at least one damper opening;
a fuel inlet component, integrated within the fuel rail body as a one-piece component and in fluidic contact with a fuel line;
one or more dampers, positioned in contact with the at least one damper opening;
one or more fuel exit ports;
one or more fuel injectors, in fluidic contact with the one or more fuel exit ports and at least one cylinder of the combustion engine;
a fastener configured to secure the fuel rail body to a cylinder wall of the combustion engine, wherein the fastener contacts the cylinder wall;
an ignition system, for igniting fuel within the one or more cylinders and crankcase;
an air intake system, positioned at least partially in one or more of a crankcase and one or more cylinders, for providing air to the crankcase and the cylinders; and
an exhaust system for ejecting gases from the one or more cylinders and crankcase.

18. The two-stroke internal combustion engine of claim 17, wherein the engine comprises two cylinders and a twin fuel rail assembly in fluidic contact with the two cylinders.

19. The two-stroke internal combustion engine of claim 18, where the fuel rail comprises a single fuel damper.

20. The two-stroke internal combustion engine of claim 17, wherein the engine comprises a mono-block with two cylinders and a fuel rail assembly in fluidic contact with a plurality of cylinders within the mono-block.

21. The two-stroke internal combustion engine of claim 20, wherein the fuel rail assembly is in contact with the cylinders through a single head.

22. A snowmobile, comprising:
an engine, mounted on a chassis, the engine including:
a fuel rail assembly, including:
a fuel rail body, including at least one damper opening;
a fuel inlet component, integrated within the fuel rail body as a one-piece component and in fluidic contact with a fuel line;
one or more dampers, positioned in contact with the at least one damper opening;
one or more fuel exit ports;
one or more fuel injectors, in fluidic contact with the one or more fuel exit ports and at least one cylinder of the combustion engine;
a fastener configured to secure the fuel rail body to a cylinder wall of the combustion engine, wherein the fastener contacts the cylinder wall;
handlebars and one or more skis, in contact with the chassis;
a drive track, in contact with the chassis; and
a drive train, operatively interconnecting the engine with the drive track for delivering propulsive power to the drive track.

* * * * *